United States Patent
Fong et al.

(10) Patent No.: US 7,345,850 B2
(45) Date of Patent: Mar. 18, 2008

(54) METHOD AND APPARATUS FOR UTILIZING AN OFF-CENTER GIMBAL TO INCREASE HEAD TO DISK INTERFACE RELIABILITY FOR CONTACT RECORDING SYSTEMS

(75) Inventors: Walton Fong, San Jose, CA (US); Donald R. Gillis, San Jose, CA (US); Remmelt Pit, Cupertino, CA (US); Mike Suk, San Jose, CA (US)

(73) Assignee: Hitachi Global Storage Technologies Netherlands, B.V., Amsterdam (NL)

(*) Notice: Subject to any disclaimer, the term of this patent is extended or adjusted under 35 U.S.C. 154(b) by 412 days.

(21) Appl. No.: 11/078,101

(22) Filed: Mar. 11, 2005

(65) Prior Publication Data
US 2006/0203394 A1 Sep. 14, 2006

(51) Int. Cl.
G11B 5/58 (2006.01)
(52) U.S. Cl. .............. 360/246.1; 360/246.2; 360/234.6; 360/236.5; 360/245.3
(58) Field of Classification Search ............ 360/234.6, 360/246.1, 246.2, 236.5, 245.3
See application file for complete search history.

(56) References Cited

U.S. PATENT DOCUMENTS

| | | | |
|---|---|---|---|
| 5,235,484 A * | 8/1993 | Maruyama ............ 360/234.6 |
| 5,327,310 A | 7/1994 | Bischoff et al. |
| 5,420,735 A | 5/1995 | Haines |
| 5,572,385 A * | 11/1996 | Kuwamoto ............ 360/234.6 |
| 6,226,151 B1 | 5/2001 | Haddock |
| 6,381,104 B1 * | 4/2002 | Soeno et al. ............ 360/294.4 |
| 6,597,539 B1 | 7/2003 | Stupp et al. |
| 6,654,205 B1 | 11/2003 | O'Hara et al. |
| 6,771,466 B2 * | 8/2004 | Kasajima et al. ........ 360/234.6 |
| 2001/0028536 A1 | 10/2001 | Sugimoto et al. |
| 2002/0176210 A1 | 11/2002 | Hamilton |
| 2003/0021059 A1 | 1/2003 | Kohira et al. |
| 2004/0016107 A1 | 1/2004 | Alexopoulos et al. |

OTHER PUBLICATIONS

IEEE Transactions on Magnetics vol. 26, Issue 5, Sep. 1990 p. 2478-83.

* cited by examiner

Primary Examiner—Jefferson Evans
(74) Attorney, Agent, or Firm—Duke Amaniampong

(57) ABSTRACT

An apparatus and method for utilizing an off-center gimbal to increase head to disk interface reliability for contact recording systems. The method provides a suspension for reaching over a disk. A slider having a read/write head element on a trailing edge (TE) portion is also provided, the slider coupled with the suspension. In addition, an off-center gimbal device is coupled with the slider and the suspension away from the center of the slider and closer to the TE portion of the slider such that when the TE portion of the slider contacts a disk a bouncing motion of the TE with respect to the disk is reduced.

22 Claims, 10 Drawing Sheets

METHOD AND APPARATUS FOR UTILIZING AN OFF-CENTER GIMBAL TO INCREASE HEAD TO DISK INTERFACE RELIABILITY FOR CONTACT RECORDING SYSTEMS

TECHNICAL FIELD

The present invention relates to the field of hard disk drive development, and more particularly to an apparatus and method for utilizing an off-center gimbal to increase head to disk interface reliability for contact recording systems.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The arm carries a head assembly that has a magnetic read/write transducer or head for reading/writing information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modem hard disk drives are much smaller and include disk diameters of less than 2.5 inches (micro drives are significantly smaller than that). Advances in magnetic recording are also primary reasons for the reduction in size.

However, the decreased track spacing and the overall reduction in HDD component size and weight have resulted in problems with respect to the HGA. Specifically, as the component sizes shrink, a need for tighter aerial density arises. In other words, the HGA is brought physically closer to the magnetic media. In some cases, the HGA will reach "ground zero" or contact recording. However, one of the major problems with contact recording or near contact recording is the effect of friction on the head portion of the HGA when it encounters the magnetic media or disk. That is, when the head contacts the disk at operational speed, the friction between the disk and the head will cause violent interaction between the disk surface and the head surface. For example, during close flight, the head may intermittently encounter the disk resulting in bouncing.

One solution to the problem of friction and bouncing of the head with respect to the disk is to provide lubrication between the head and the disk surfaces to reduce the friction component. However, the introduction of a lubrication into the HDD results in additional problems such as lubricant depletion, re-distribution, decomposition, and the like.

SUMMARY

An apparatus and method for utilizing an off-center gimbal to increase head to disk interface reliability for contact recording systems. The method provides a suspension for reaching over a disk. A slider having a read/write head element on a trailing edge (TE) portion is also provided, the slider coupled with the suspension. In addition, an off-center gimbal device is coupled with the slider and the suspension away from the center of the slider and closer to the TE portion of the slider such that when the TE portion of the slider contacts the disk, a bouncing motion of the TE with respect to the disk is reduced.

BEST MODES FOR CARRYING OUT THE INVENTION

Reference will now be made in detail to the alternative embodiment(s)s of the present invention, an apparatus and method for utilizing an off-center gimbal to increase head to disk interface reliability for contact recording systems. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of an electrical lead suspension (ELS) in conjunction with its operation within a hard disk drive and components connected therewith. For purposes of clarity, the overview embodiment will provide one of a plurality of possible termination pads connecting the ILS to the main flex package cable (FPC) setups. The discussion will then focus on embodiments of a method for utilizing an off-center gimbal to increase head to disk interface reliability for contact recording systems in particular.

Figure 1:
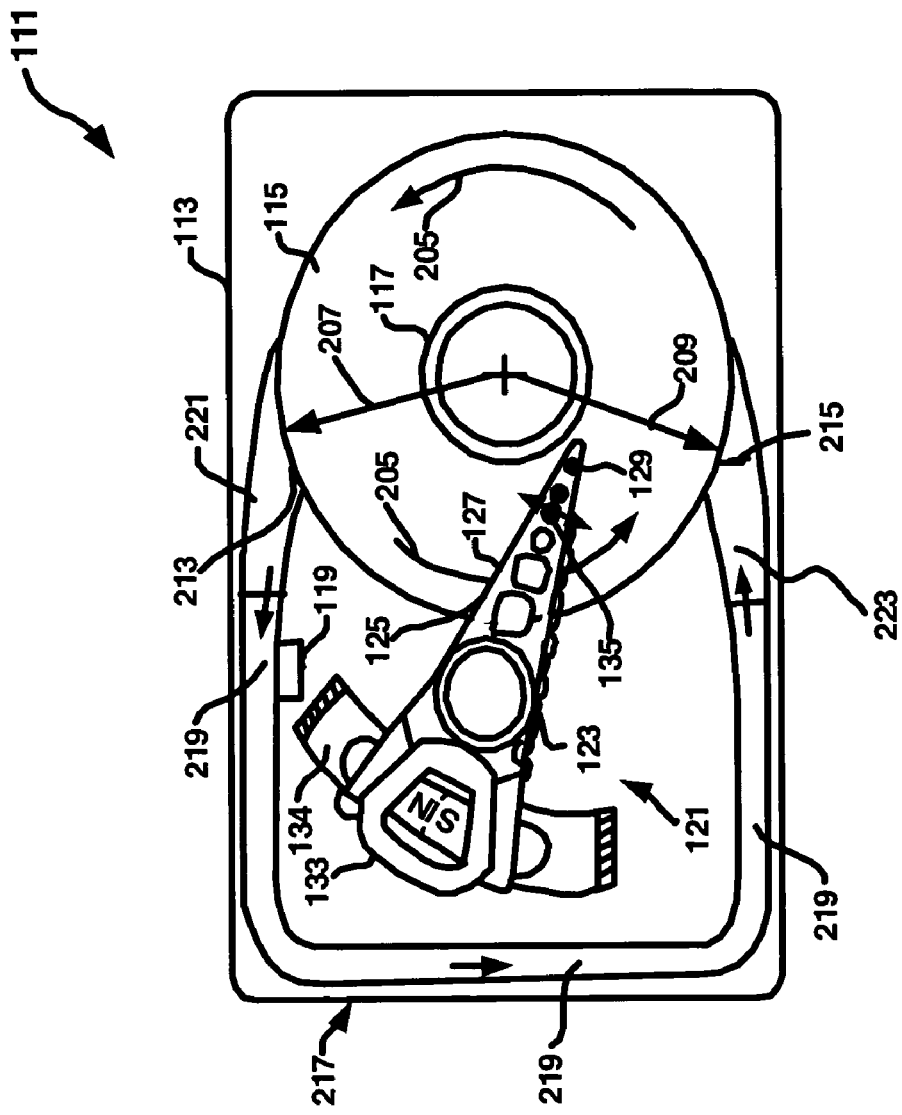
FIG. 1 is a schematic top plan view of a hard disk drive, in accordance with one embodiment of the present invention.

With reference now to FIG. 1, a schematic drawing of one embodiment of an information storage system comprising a magnetic hard disk file or drive 111 for a computer system is shown. Embodiments of the invention are well suited for utilization on a plurality of hard disk drives. The utilization of the driver of FIG. 1 is merely one of a plurality of disk drives which may be utilized in conjunction with the present invention. For example, in one embodiment the hard disk drive 111 would use load/unload (L/UL) techniques with a ramp. In another embodiment, the drive is a non L/UL drive, for example, a CSS drive. In yet another embodiment, the disk drive 111 includes an HGA with a nose limiter. In another embodiment, the disk drive 111 includes an HGA without a nose limiter.

In the exemplary FIG. 1, Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered ELS 129. It should be understood that ELS 129 may be, in one embodiment, an integrated lead suspension (ILS) that is formed by a subtractive process. In another embodiment, ELS 129 may be formed by an additive process, such as a Circuit Integrated Suspension (CIS). In yet another embodiment, ELS 129 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer or head is mounted on a slider and secured to a flexure that is flexibly mounted to each suspension 129. The read/write heads magnetically read data from and/or magnetically write data to disk 115. The level of integration called the head gimbal assembly is the head and the slider 130, which are mounted on suspension 127. The slider 130 is usually bonded to the end of ELS 129.

ELS 129 has a spring-like quality, which biases or presses the air-bearing surface of the slider 130 against the disk 115 to cause the slider 130 to fly at a precise distance from the disk. ELS 129 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

Figure 2:
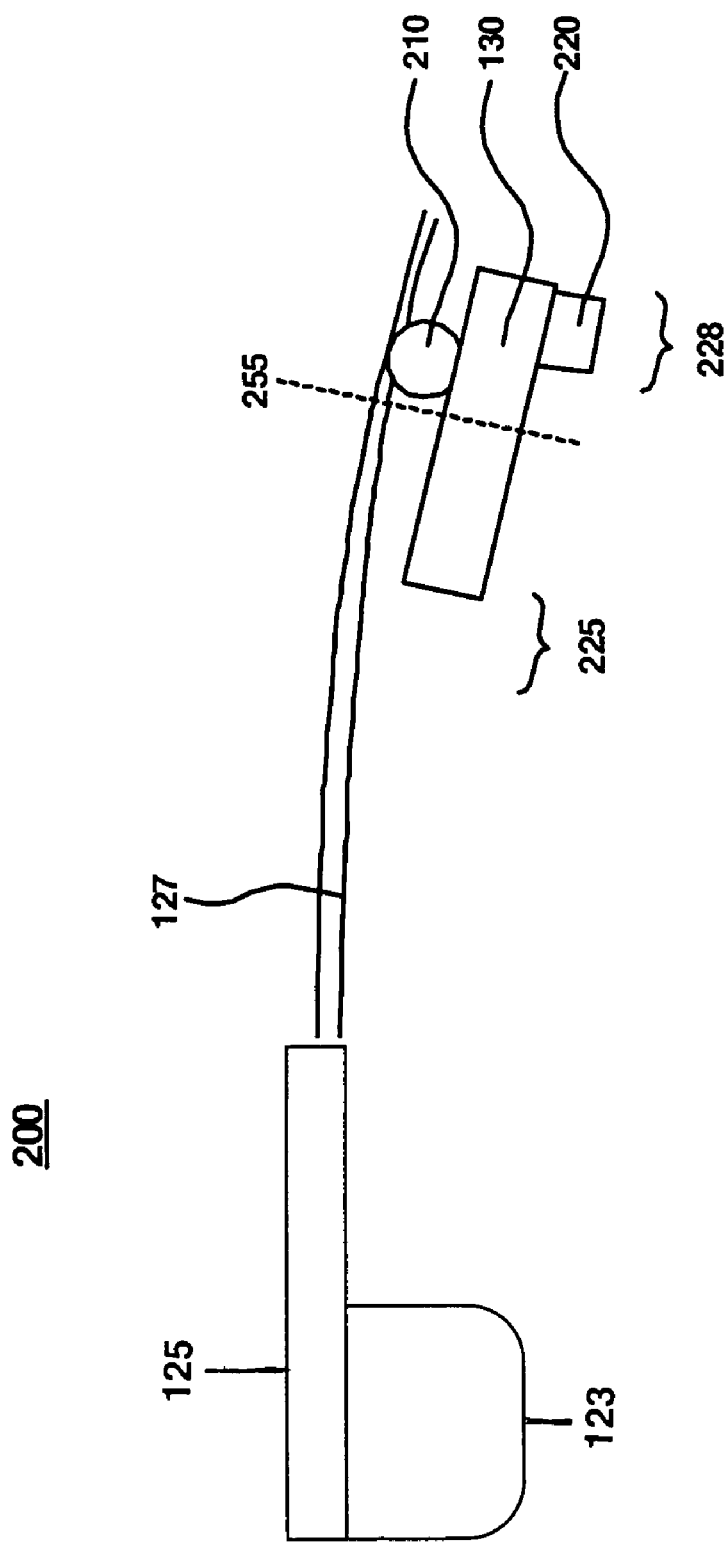
FIG. 2 is a side view of an exemplary actuator according to one embodiment of the present invention.

Referring now to FIG. 2, a side view of an exemplary actuator 200 is shown in accordance with one embodiment of the present invention. In one embodiment, as described herein, the actuator arm 125 has extending from it at least one cantilevered ELS 129. A magnetic read/write transducer or head 220 is mounted on a slider 130 and secured via a gimbal 210 that is coupled to each ELS 129. The level of integration called the head gimbal assembly (HGA) is the head 220 and the slider 130, which are mounted on suspension 127. The slider 130 has a leading edge (LE) portion 225 and a trailing edge portion (TE) 228, with the head 220 at the TE portion 228 of the slider 130.

As shown in FIG. 2, the slider 130 is not coupled with the gimbal 210 at the center 255 of the slider 130 but is instead offset toward the TE 228. In one embodiment, the slider 130 is coupled with the gimbal 210 approximately 20 percent of the distance between the center 255 of the slider 130 and the TE 228 of the slider 130 toward the TE 228 of the slider 130. Although 20 percent is stated herein as a distance off-center, embodiments are well suited to a plurality of off-center distances both greater and smaller than 20 percent.

In one embodiment, the mounting of the slider 130 to the suspension 127 is modified (e.g., off center) to reduce the pivot range of the TE 228 of the slider 130 thereby reducing the amount of bounce seen at the head 220. For example, in a center-mounted slider to gimbal HGA, when contact is made between the head portion and the disk portion, the slider can bounce drastically at both the leading edge and the trailing edge. By moving the gimbal 210 connection back toward the TE 228, then the TE 228 portion and further the head 220 will not move as much as the rest of the slider 130 when contact with the disk occurs. In other words, by moving the gimbal 210 connection rearward, the lever arm of the slider 130 between the gimbal 210 connection and the TE 228 is reduced.

Figure 3:
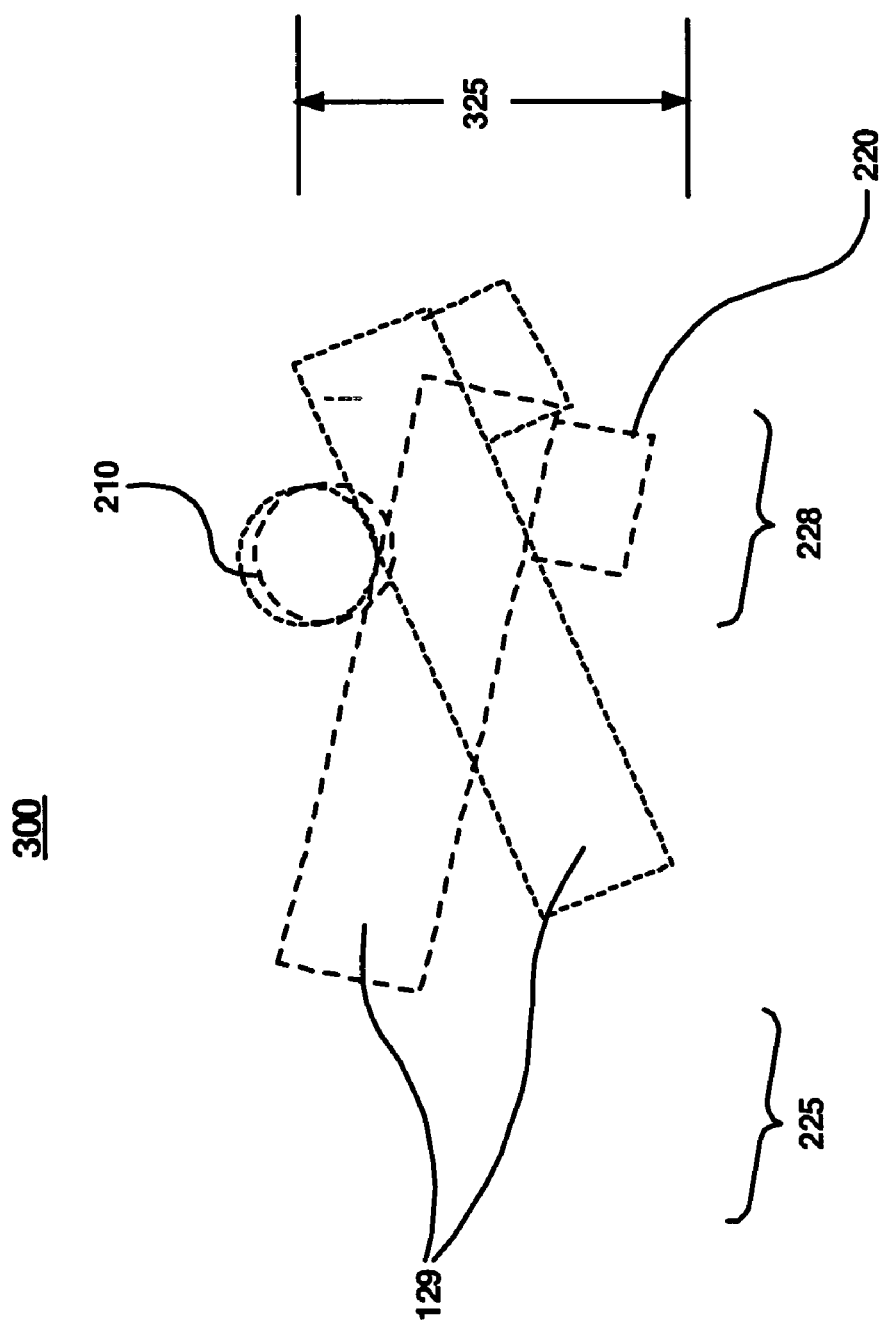
FIG. 3 is a side view of the exemplary slider portion having reduced trailing edge motion in accordance with one embodiment of the present invention.

With reference now to FIG. 3, a side view 300 of an exemplary slider portion 129 having reduced trailing edge 228 motion is shown in accordance with one embodiment of the present invention. That is, side view 300 illustrates the reduced motion 325 of the TE 228 portion of the slider 130 when the gimbal 210 connection is moved toward the TE portion 228. By reducing the motion 325 of the TE portion 228 a reduction in the travel of the head 220 is realized. For example, if the head 220 contacts the disk 115 the friction generated by the contact will cause the TE portion 228 of the slider 130 to bounce. Since the motion 325 of the TE portion 228 is reduced, the head 220 does not bounce as high or return with significant energy to damage the disk 115. Therefore, by reducing the amplitude of the bounce with respect to the head 220 and the disk 115, a gain in read/write information is found while detrimental damage to the disk 115 and/or head 220 is reduced. That is, since the amplitude of the bounce is reduced, the head 220 spends less time in a non-disk accessible attitude.

Figure 4:
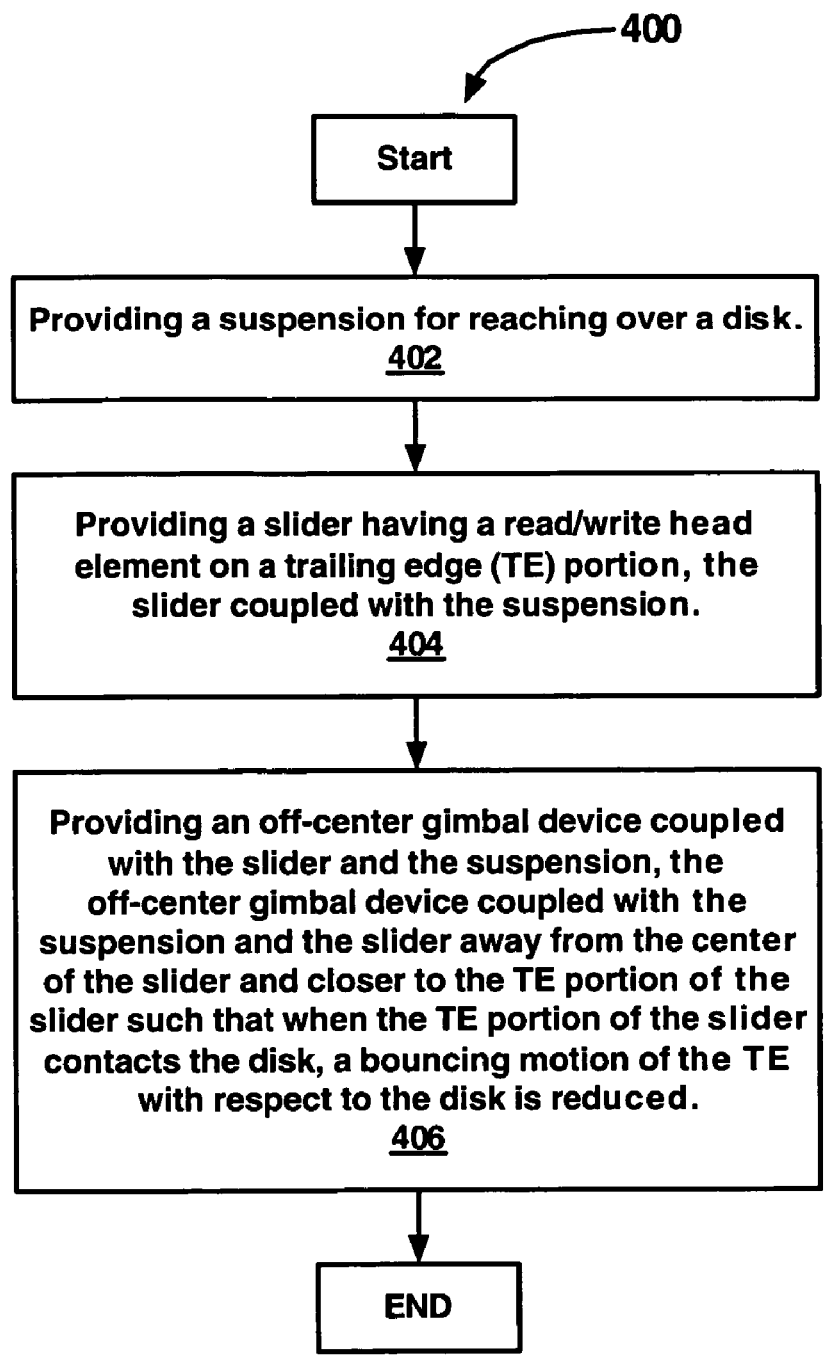
FIG. 4 is a flowchart of a method for utilizing an off-center gimbal to increase head to disk interface reliability for contact recording systems in accordance with one embodiment of the present invention.

Referring now to FIG. 4, a flowchart 400 of a method for utilizing an off-center gimbal to increase head to disk interface reliability for contact recording systems is shown in accordance with one embodiment of the present invention.

With reference now to step 402 of FIG. 4 and to FIG. 2, one embodiment provides a suspension 127 for reaching over a disk 115. As described in detail herein, the suspension (e.g., ELS) 127 has a spring-like quality, which biases or presses the air-bearing surface of the slider 130 against the disk 115 to cause the slider 130 to fly at a precise distance from the disk.

With reference now to step 404 of FIG. 4 and to FIG. 2, one embodiment provides a slider having a read/write head element 220 on a trailing edge (TE) portion 228, the slider 130 coupled with the suspension 129. In one embodiment, the head 220 is a portion of a contact recording system. That is, the head 220 is brought to "ground zero" or into contact with the disk it is over flying. In another embodiment, the head 220 has a tight aerial density and is not in contact with the disk 115 it is over flying, but is hovering just above the disk 115. In other words, although the head 220 is not designed to be in contact with the disk 115, due to the closeness with which it is flying with respect to the disk 115, intermittent contact will occur.

With reference now to step 406 of FIG. 4 and to FIG. 2, one embodiment provides an off-center gimbal device 210 coupled with the slider 130 and the suspension (e.g., ELS 129). The off-center gimbal device 210 is coupled with the suspension 127 and the slider 130 away from the center 255 of the slider 130 and closer to the TE portion 228 of the slider 130 such that when the TE portion 228 of the slider (in one embodiment, the head 220) contacts a disk 115 a bouncing motion of the TE portion 228 with respect to the disk 115 is reduced. That is, as stated herein, by moving the gimbal 210 connection closer to the TE 228 of the slider 130, the lever arm of the slider 130 with respect to the TE 228 is reduced. The reduction in the lever arm results in a reduced motion area 325 as shown in FIG. 3.

Figure 5:
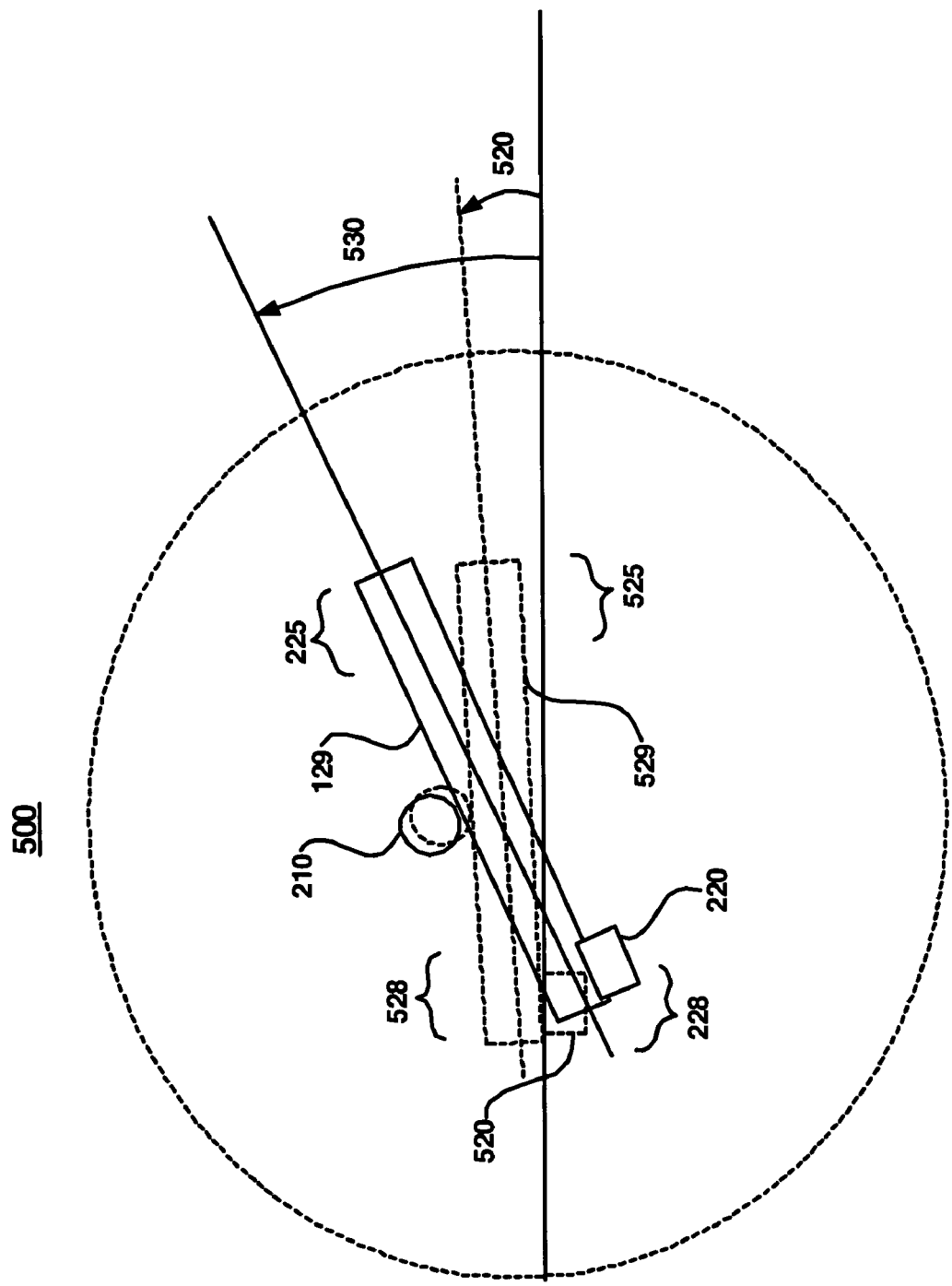
FIG. 5 is a side view of the exemplary slider portion having an increased dynamic pitch in accordance with one embodiment of the present invention.

With reference now to FIG. 5, a side view of the exemplary slider portion 129 having an increased dynamic pitch attitude is shown in accordance with one embodiment of the present invention. In general, diagram 500 shows a normal dynamic pitch attitude 520 of a slider 529 in a dotted line format having a leading edge 525 with a pitch angle of 30 microradians. In general, with a slider 130 flying at a pitch angle of approximately 30 microradians, then the slider 130 is flying over the disk 115 and the TE 528 touches the disk, the friction causes the LE 525 to pitch forward as a reaction. When the LE 525 pitches forward, it will drive the LE 525 into the disk 115 and cause damage to the surface of the disk 115 and cause a large bounce which will also bring the TE 528 (including the head 520) down onto the disk 115 with a large amount of energy. By increasing the dynamic pitch attitude 530 of the slider 130, to an angle of 65 microradians or greater, the lift force generated by the LE 225 will have enough time to recover after the effects of a TE 228 disk contact event. That is, when the TE 228 contacts the disk and the LE 225 begins to pitch forward as a reaction, the greater dynamic pitch 530 will provide the LE 225 with enough lift and time to recover the correct attitude (e.g., LE up TE down) before the LE 225 crashes into the disk 115 surface causing damage and the "bounce".

Figure 6:
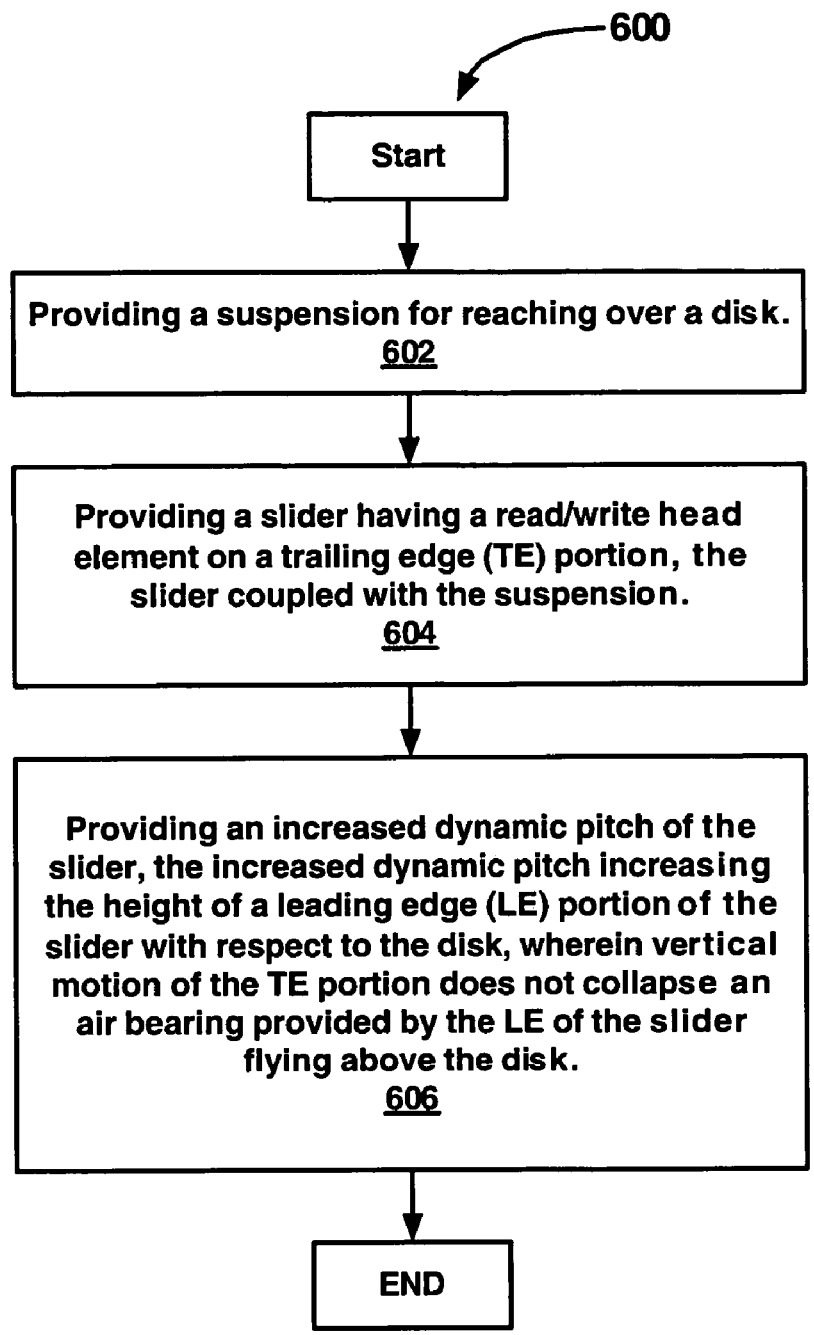
FIG. 6 is a flowchart of a method for increasing a dynamic pitch of a slider element to increase head to disk interface reliability for contact recording systems in accordance with one embodiment of the present invention.

Referring now to FIG. 6, a flowchart 600 of a method for increasing dynamic pitch of a slider element to increase head to disk interface reliability for contact recording systems is shown in accordance with one embodiment of the present invention.

With reference now to step 602 of FIG. 6 and to FIG. 2, one embodiment provides a suspension 127 for reaching over a disk 115. As described in detail herein, the suspension (e.g., ELS) 127 has a spring-like quality, which biases or presses the air-bearing surface of the slider 130 against the disk 115 to cause the slider 130 to fly at a precise distance from the disk.

With reference now to step 604 of FIG. 6 and to FIG. 2, one embodiment provides a slider having a read/write head element 220 on a trailing edge (TE) portion 228, the slider 130 coupled with the suspension 129. In one embodiment, the head 220 is a portion of a contact recording system. That is, the head 220 is brought to "ground zero" or into contact with the disk it is over flying. In another embodiment, the head 220 has a tight aerial density and is not in contact with the disk 115 it is over flying, but is hovering just above the disk 115. In other words, although the head 220 is not designed to be in contact with the disk 115, due to the closeness with which it is flying with respect to the disk 115, intermittent contact will occur.

With reference now to step 606 of FIG. 6 and to FIG. 5, one embodiment provides an increased dynamic pitch 530 of the slider 130, the increased dynamic pitch increasing the height of a leading edge (LE) portion of the slider 130 with respect to the disk 115 and reducing the height of the TE portion of the slider 130 with respect to the disk 115, wherein vertical motion of the TE portion does not collapse an air bearing provided by the LE 225 flying above the disk 115. In one embodiment, the increased dynamic pitch 530 is approximately 65 microradians or greater. As stated herein, by increasing the dynamic pitch 530 the air-bearing surface of the slider 130 has enough time to recover before the LE 225 strikes the disk 115. That is, the slider 130 has enough time and enough lift thanks to the increased dynamic pitch 530 to allow it to raise the LE 225 without allowing it to strike the disk or loose its air bearing by making contact with the disk 115.

In one embodiment, the increased dynamic pitch 530 is combined with the off-center gimbal 210 to provide a plurality of mechanical forces to counteract the effect of friction when the TE portion 228 and/or head 220 makes contact with the disk 115.

Figure 7:
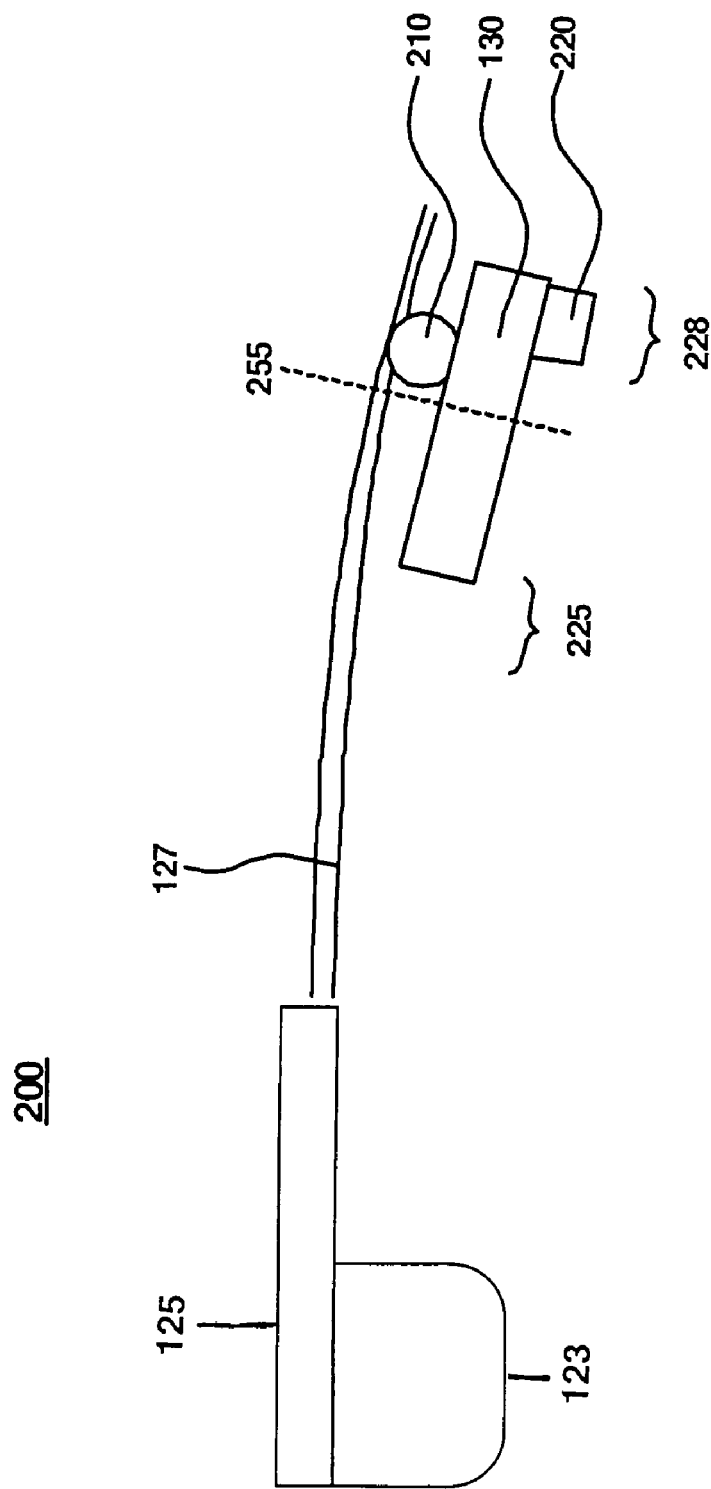
FIG. 7 is a side view of an exemplary electrical lead suspension (ELS) with a reduced gram load according to one embodiment of the present invention.

With reference now to FIG. 7, a side view of an exemplary electrical lead suspension (ELS) with a reduced gram load is shown in accordance with one embodiment of the present invention. In one embodiment, as described herein, the actuator arm 125 has extending from it at least one cantilevered (load beam removed) ELS 129. A magnetic read/write transducer or head 220 is mounted on a slider 130 and secured via a gimbal 210 that is coupled to each ELS 129. The level of integration called the head gimbal assembly (HGA) is the head 220 and the slider 130, which are mounted on suspension 127. The slider 130 has a leading edge (LE) portion 225 and a trailing edge portion (TE) 228, with the head 220 at the TE portion 228 of the slider 130.

ELS 129 has a spring-like quality, which biases or presses the air-bearing surface of the slider 130 against the disk 115 to cause the slider 130 to fly at a precise distance from the disk. ELS 129 has a hinge area that provides for the spring-like quality, and a flexing interconnect (or flexing interconnect) that supports read and write traces through the hinge area. As is well known, friction is a function of normal loading force. That is, lower normal loading force results in a lower friction force in the sliding direction. Moreover, bouncing of the TE 225 of the slider 130 occurs because of the friction force generated when the TE 228 and/or head 220 makes contact with the disk 115. Therefore, if an amount of force pushing down the TE 228 is reduced, the amount of friction generated is reduced during the contact between TE 228 and the disk 115 providing less pitch down motion of the slider 130. In one embodiment, the reduction of force pushing down the slider 130 is accomplished by reducing the gram load the suspension 127 applies to the slider 130. In one embodiment, the gram load is reduced to 0.5 grams. In other words, the preload of the suspension 127 is reduced thereby reducing the amount of reaction that is seen during contact between the disk 115 and the TE 228 and/or head 220.

Figure 8:
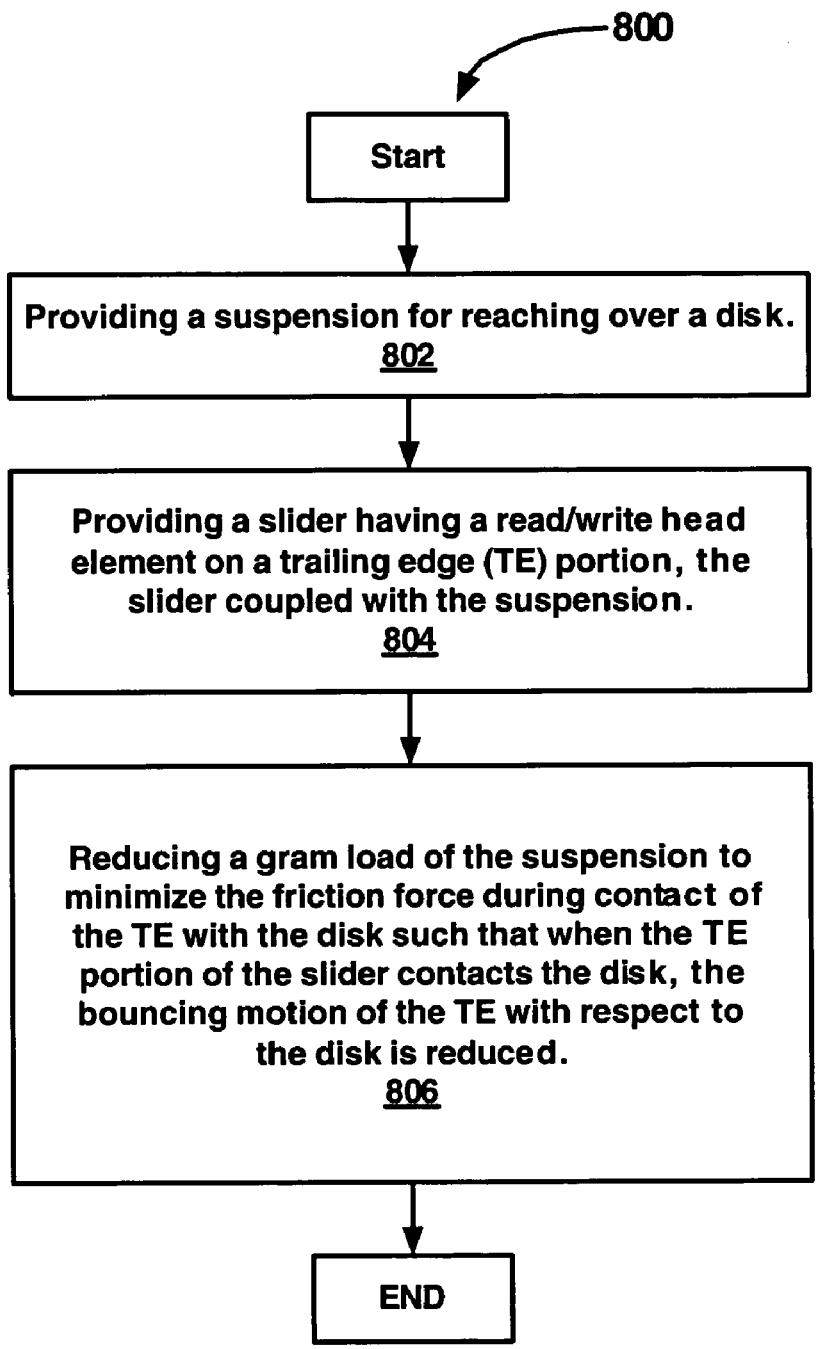
FIG. 8 is a flowchart of a method for reducing the gram load of a slider element to increase head to disk interface reliability for contact recording systems in accordance with one embodiment of the present invention.

Referring now to FIG. 8 is a flowchart 800 of a method for reducing the gram load of a slider element to increase head to disk interface reliability for contact recording systems is shown in accordance with one embodiment of the present invention.

With reference now to step 802 of FIG. 8 and to FIG. 2, one embodiment provides a suspension 127 for reaching over a disk 115. As described in detail herein, the suspension (e.g., ELS) 127 has a spring-like quality, which biases or presses the air-bearing surface of the slider 130 against the disk 115 to cause the slider 130 to fly at a precise distance from the disk.

With reference now to step 804 of FIG. 8 and to FIG. 2, one embodiment provides a slider having a read/write head element 220 on a trailing edge (TE) portion 228, the slider 130 coupled with the suspension 129. In one embodiment, the head 220 is a portion of a contact recording system. That is, the head 220 is brought to "ground zero" or into contact with the disk it is over flying. In another embodiment, the head 220 has a tight aerial density and is not in contact with the disk 115 it is over flying, but is hovering just above the disk 115. In other words, although the head 220 is not designed to be in contact with the disk 115, due to the closeness with which it is flying with respect to the disk 115, intermittent contact will occur.

With reference now to step 806 of FIG. 8 and to FIG. 7, one embodiment reduces a gram load of the suspension 127 to less than 1 gram to minimize the friction force during contact of the TE 228 with the disk 115 such that when the TE 228 portion and/or head 220 of the slider 130 contacts the disk 115 the bouncing motion of the TE 228 with respect to the disk 115 is reduced. In one embodiment, the gram load of the suspension 127 is reduced to 0.5 grams.

In one embodiment, changing the amount of bend in the suspension 127 reduces the gram load provided by the suspension 127. For example, in one embodiment, the suspension is a piece of stainless sheet metal (or the like) having a preloaded bend. By modifying the preloaded bend, the gram load provided to the slider 130 is also reduced. Therefore, when the arm 125 is mounted on the spindle 123, the suspension, which may be in another embodiment a laminate of three layers (e.g., steel, polyimide, and copper), will provide a certain loading force. In addition, the slider 130 has an air bearing force that will lift it until an equilibrium is met. In one embodiment, by reducing the gram load of the suspension 127, the air bearing force generated by the slider 130 can also be reduced.

In one embodiment, the reduced gram load of the suspension 127 is combined with the increased dynamic pitch 530 and/or the off-center gimbal 210 to provide a plurality of mechanical forces to counteract the effect of friction when the TE portion 228 and/or head 220 makes contact with the disk 115.

Figure 9:
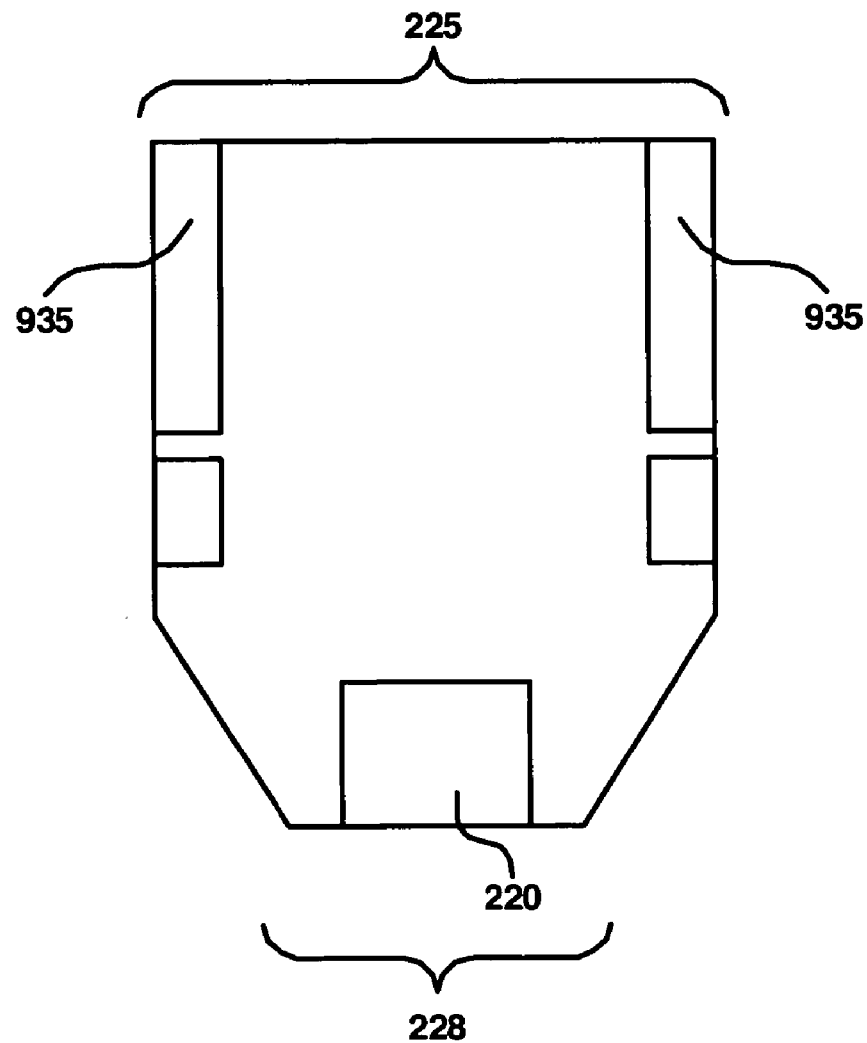
FIG. 9 is a bottom view of an exemplary slider portion of an electrical lead suspension (ELS) according to one embodiment of the present invention.

With reference now to FIG. 9 is a bottom view 900 of an exemplary slider portion is shown in accordance with one embodiment of the present invention. In general, bottom slider view 900 includes a LE 225, air bearing force generators 935, TE 228 and head 220. In one embodiment, the TE 228 pad is shaped to reduce the air bearing force generated by the pad and minimizes the contact area between the disk 115 and the head 220. For example, as the slider 130 flies closer to the disk 115 the slider 130 begins to encounter ground effect. That is, the airflow under the slider 130 become highly pressurized between the slider 130 and the disk 115. In so doing, the ability to allow the head 220 to contact or fly very close to the disk 115 is impacted. This phenomenon is well understood in the area of Aerodynamics. These ground effects are strong enough to cause the TE 228 to bounce into the air and may even cause the LE 225 to impact the disk and cause damage.

By shaping the TE 228 of the slider, the air bearing forces at the TE 228 can be reduced and the air bearing forces at the LE 225 can be increased. Therefore, the overall sum of the lifting force is the same, however, the center of lift has moved toward the LE 225. By reducing the air bearing forces at the TE 228, there is less normal load on the TE 225 and/or head 220 of the slider 130 when it contacts the disk 115 surface. In other words, less friction occurs during the contact resulting in less slider bounce. In addition, by reducing the size of the TE 228 and/or the head 220, the total contact area between the slider 130 and the disk 115 is also reduced. By reducing the contact area, the friction generated by a contact event is also reduced.

Figure 10:
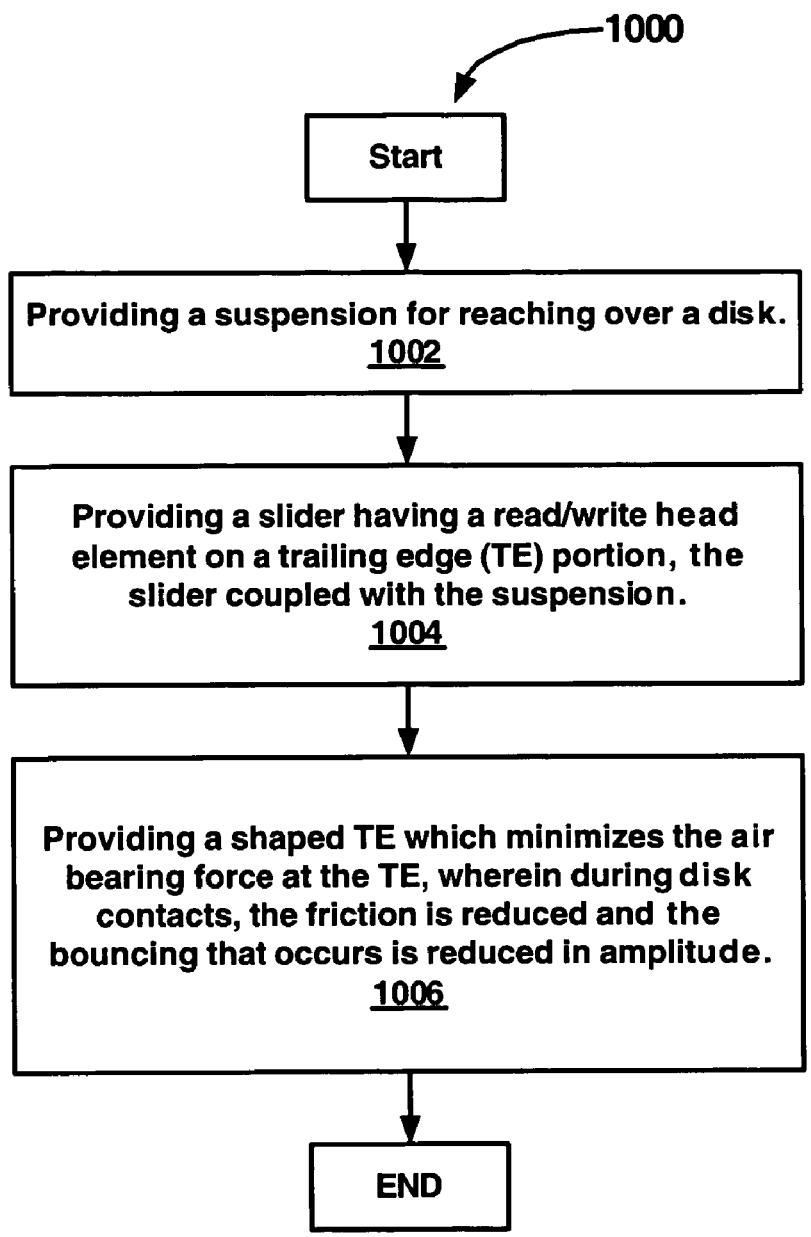
FIG. 10 is a flowchart of a method for providing a shaped TE to reduce air bearing force at the TE and minimize contact area between the disk and slider to increase head to disk interface reliability for contact recording systems in accordance with one embodiment of the present invention.

Referring now to FIG. 10 is a flowchart 1000 of a method for providing a redistributed air bearing force coefficient for a slider element to increase head to disk interface reliability for contact recording systems is shown in accordance with one embodiment of the present invention.

With reference now to step 1002 of FIG. 10 and to FIG. 2, one embodiment provides a suspension 127 for reaching over a disk 115. As described in detail herein, the suspension (e.g., ELS) 127 has a spring-like quality, which biases or presses the air-bearing surface of the slider 130 against the disk 115 to cause the slider 130 to fly at a precise distance from the disk.

With reference now to step 1004 of FIG. 10 and to FIG. 2, one embodiment provides a slider having a read/write head element 220 on a trailing edge (TE) portion 228, the slider 130 coupled with the suspension 129. In one embodiment, the head 220 is a portion of a contact recording system. That is, the head 220 is brought to "ground zero" or into contact with the disk it is over flying. In another embodiment, the head 220 has a tight aerial density and is not in contact with the disk 115 it is over flying, but is hovering just above the disk 115. In other words, although the head 220 is not designed to be in contact with the disk 115, due to the closeness with which it is flying with respect to the disk 115, intermittent contact will occur.

With reference now to step 1006 of FIG. 10 and to FIG. 9, one embodiment provides a shaped TE to reduce air bearing force at the TE, which minimizes the normal load and friction during contact to reduce slider bounce. In another embodiment, the contact area of the head 220 and/or TE portion 228 of the slider 130 is reduced.

In one embodiment, the redistributed air bearing force is combined with the reduced gram load of the suspension 127, the increased dynamic pitch 530 and/or the off-center gimbal 210 to provide a plurality of mechanical forces to counteract the effect of friction when the TE portion 228 and/or head 220 makes contact with the disk 115.

Thus, embodiments of the present invention provide, a method and system for utilizing an off-center gimbal to increase head to disk interface reliability for contact recording systems. Additionally, embodiments provide a method and system for utilizing an off-center gimbal to increase head to disk interface reliability for contact recording systems which can reduce the induced friction when a head portion contacts the disk portion.

While the method of the embodiment illustrated in flow charts 400, 600, 800 and 1000 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method and system for utilizing an off-center gimbal to increase head to disk interface reliability for contact recording systems is thus described. While the present invention has been described in particular embodiments, it should be appreciated that the present invention should not be construed as limited by such embodiments, but rather construed according to the below claims.

What is claimed is:

1. A method for utilizing an off-center gimbal to increase head to disk interface reliability for contact recording systems comprising:
   providing a suspension for reaching over a disk;
   providing a slider having a read/write head element on a trailing edge (TE) portion, said slider coupled with said suspension; and
   providing an off-center gimbal device coupled with said slider and said suspension, said off-center gimbal device coupled with said suspension and said slider, said off-center gimbal device located approximately 20 percent of the distance between the center of said slider and the TE portion of the slider toward said TE portion of said slider such that when said TE portion of said slider contacts a disk a bouncing motion of said TE portion with respect to said disk is reduced.

2. The method of claim 1 further comprising:
   providing an increased dynamic pitch of said slider, said increased dynamic pitch increasing the height of a leading edge (LE) portion of said slider with respect to said disk and reducing the height of said TE portion of said slider with respect to said disk, wherein vertical motion of said TE portion does not collapse an air bearing provided by said LE of said slider flying above said disk.

3. The method of claim 2 wherein said increased dynamic pitch of said LE of said slider is approximately 65 microradians or greater.

4. The method of claim 1 further comprising:
   reducing a gram load of said suspension to less than 1 gram to minimize the friction force during contact of said TE with said disk such that when said TE portion of said slider contacts said disk the bouncing motion of said TE with respect to said disk is reduced.

5. The method of claim 4 wherein said gram load of said suspension is reduced to 0.5 grams.

6. The method of claim 1 further comprising:
   providing a redistributed air bearing force for said TE portion of said slider, to minimize the normal load and friction during contact to reduce slider bounce.

7. The method of claim 6 further comprising:
   reducing the contact area of said head portion at the TE of the slider.

8. An actuator having an off-center gimbal to increase head to disk interface reliability for contact recording systems comprising:
   a suspension for reaching over a disk;
   a slider having a read/write head element on a trailing edge (TE) portion, said slider coupled with said suspension;
   an off-center gimbal device coupled with said slider and said suspension, said off-center gimbal device coupled with said suspension and said slider away from the center of said slider and closer to said TE portion of said slider; and
   a reduced gram load of said suspension to less than 1 gram to minimize the friction force during contact of said TE portion with said disk such that when said TE portion of said slider contacts said disk the bouncing motion of said TE portion with respect to said disk is reduced such that when said TE portion of said slider contacts a disk a bouncing motion of said TE portion with respect to said disk is reduced.

9. The actuator of claim 8 wherein said off-center gimbal device is moved approximately 20 percent of the distance between the center of the slider and the TE of the slider toward the TE of the slider.

10. The actuator of claim 8 further comprising:
    an increased dynamic pitch of said slider, said increased dynamic pitch increasing the height of a leading edge (LE) portion of said slider with respect to said disk and reducing the height of said TE portion of said slider with respect to said disk, wherein vertical motion of said TE portion of said slider does not collapse an air bearing provided by said LE flying above said disk.

11. The actuator of claim 10 wherein said increased dynamic pitch is approximately 65 microradians or greater.

12. The actuator of claim 8 wherein said gram load of said suspension is reduced to 0.5 grams.

13. The actuator of claim 8 further comprising:
    a redistributed air bearing force for said TE portion of said slider to minimize the normal load and friction during contact to reduce slider bounce.

14. The actuator of claim 13 further comprising:
    reducing the contact area of said TE portion with respect to said disk.

15. A hard disk drive comprising:
    a housing;
    a disk pack mounted to the housing and having a plurality of disks that are rotatable relative to the housing, the disk pack defining an axis of rotation and a radial direction relative to the axis, and the disk pack having a downstream side wherein air flows away from the disks, and an upstream side wherein air flows toward the disk;
    an actuator mounted to the housing and being movable relative to the disk pack, the actuator having a plurality of heads for reading data from and writing data to the disks, the actuator having an off-center gimbal to increase head to disk interface reliability for contact recording systems comprising:
- a suspension for reaching over a disk;
- a slider having a read/write head element on a trailing edge (TE) portion, said slider coupled with said suspension; and
- an off-center gimbal device coupled with said slider and said suspension, said off-center gimbal device coupled with said suspension and said slider, said off-center gimbal device located approximately 20 percent of the distance between the center of said slider and the TE portion of the slider toward said TE portion of said slider such that when said TE portion of said slider contacts a disk a bouncing motion of said TE portion with respect to said disk is reduced.

16. The hard disk drive of claim 15 further comprising:
an increased dynamic pitch of said slider, said increased dynamic pitch increasing the height of a leading edge (LE) portion of said slider with respect to said disk and reducing the height of said TE portion of said slider with respect to said disk, wherein vertical motion of said TE portion of said slider does not collapse an air bearing provided by said LE of said slider flying above said disk.

17. The hard disk drive of claim 16 wherein said increased dynamic pitch is approximately 65 microradians or greater.

18. The hard disk drive of claim 15 further comprising:
a reduced gram load of said suspension to less than approximately 1 gram to minimize the friction force during contact of said TE with said disk such that when said TE portion of said slider contacts said disk the bouncing motion of said TE with respect to said disk is reduced.

19. The hard disk drive of claim 18 wherein said gram load of said suspension is reduced to 0.5 grams.

20. The hard disk drive of claim 15 further comprising:
a redistributed air bearing force for said TE portion of said slider to minimize the normal load and friction during contact to reduce slider bounce.

21. The hard disk drive of claim 20 further comprising:
reducing the contact area of said TE portion of said slider with respect to said disk.

22. An actuator having an off-center gimbal to increase head to disk interface reliability for contact recording systems comprising:
- a means for providing a suspension for reaching over a disk;
- a means for providing a slider having a read/write head element on a trailing edge (TE) portion, said slider coupled with said suspension; and
- a means for providing an off-center gimbal device coupled with said slider and said suspension, said off-center gimbal device coupled with said suspension and said slider away from the center of said slider and closer to said TE portion of said slider such that when said TE portion of said slider contacts a disk a bouncing motion of said TE with respect to said disk is reduced.

* * * * *